United States Patent [19]

Beaven

[11] Patent Number: 5,627,766

[45] Date of Patent: May 6, 1997

[54] PERFORMANCE AND STATUS MONITORING IN A COMPUTER NETWORK

[75] Inventor: Paul A. Beaven, Romsey, Great Britain

[73] Assignee: International Business Machines Corporation, Armonk, N.Y.

[21] Appl. No.: 368,075

[22] Filed: Jan. 3, 1995

[30] Foreign Application Priority Data

Feb. 8, 1994 [GB] United Kingdom ............ 9402380

[51] Int. Cl.$^6$ .................................................. G06F 11/34
[52] U.S. Cl. ........................ 364/551.01; 364/514 B; 364/550; 370/241; 395/200.11
[58] Field of Search .......................... 364/514 B, 550, 364/551.01; 370/13, 17; 395/200.11

[56] References Cited

FOREIGN PATENT DOCUMENTS 0510822  10/1992  European Pat. Off. .

OTHER PUBLICATIONS

IBM, "MQ Series", Message Queue Interface Technical Reference (SC33-0850-01), Third edtition. Nov. 1994.

Primary Examiner—Edward R. Cosimano
Attorney, Agent, or Firm—John J. Timar

[57] ABSTRACT

Provided is a method and a system for computer network monitoring, implemented in a network in which processes communicate using message queuing. Each node of the network has a network management program installed thereon which includes two independent components: a Point Of Control (POC) program for initiating network tests by injecting a test message into the network and for receiving responses from all the nodes of the network; and a Network Test Program (NTP) for sending a reply message to the single POC for a particular test when the NTP receives test messages within that test, and for propagating the test by forwarding a message to all of the current node's adjacent nodes. Test results are analyzed at the POC for display to the network administrator. Injected test messages propagate throughout the network in a self-exploring manner, exploiting the parallelism of the network. The individual nodes are not required to know the network topology other than to know their nearest neighbor nodes.

18 Claims, 3 Drawing Sheets

PERFORMANCE AND STATUS MONITORING IN A COMPUTER NETWORK

FIELD OF INVENTION

The present invention relates to computer networks and more particularly to monitoring the nodes and communications links of a computer network, for the determination of either performance or status information or to determine the topology of the network.

BACKGROUND

Increasingly, business enterprises require large, complex distributed networks to satisfy their communications and data processing requirements, and many are moving towards implementing large scale computing systems that integrate all the disparate components of the enterprise's computing resources. The efficiency and reliability of communications within these networks is becoming increasingly more important to the overall efficiency of the computing resources. Network management facilities are provided to rectify communications problems, and also to recognize potential problems before they result in communications outages, unacceptable response times, or other impairments (i.e. problem recognition as well as problem resolution). Complex networks often require computer-based systems and network tools to monitor network equipment and facilities, as part of the provision of network management facilities. Concerns about communications' performance and operating costs, and the effects on these variables of node and link failures and reductions in availability, have increased with device and network complexity and sophistication. Hence, the need for monitoring has increased together with the need to enable network reconfiguration from a central location and the generation of alarms when predefined conditions occur.

A highly desirable attribute of network monitoring systems is that they provide the facilities to obtain information, from a single node in the network, about: the state (operational or failed) of any accessible link in the network; the performance of any such operational link (the time taken for inter-node transmissions to traverse that link); and possibly also a specified set of status parameters for each node in the network (in this context, a network node may be either a computer within a network or an application program entity running on the computer).

A monitoring facility is provided in TCP/IP (Transmission Control Protocol/Internet Protocol suite of communications protocols), in the Internet Control Message Protocol (ICMP). ICMP provides error reporting, handling several types of error conditions and always reporting errors back to the original source of the message which led to the error being detected. Any computer using IP accepts ICMP error messages and will change behavior in response to reported errors. Communications links between specific nodes of the network are tested by a first network node (A) sending a timestamped "ICMP Echo Request" message to a second specified node (B). The receiving node (B) then generates a timestamped "ICMP Echo Reply" reply message (reversing the request datagram's source and destination addresses) and transmits it to node A. On receipt of the reply, the node A timestamps the received reply. The time taken to traverse the links (the performance of communication links) between the nodes in each direction can then be calculated. This test facility, known as "pinging" between the nodes, is limited to testing end-to-end performance (from node A to target node B, and vice versa).

U.S. Pat. 5,095,444 describes a system for measuring application message transmission delays in a communications network, providing measurement of delays in the transmission on the various inter-node links of a predetermined communications route between a source node and a destination node. The source node requests (across the communications route) a response from the destination node and a monitor program determines the issue time of the request. The source node then receives the response and the monitor program determines the time of receipt. A transmission delay between the source node and the destination node is determined by calculating a difference between the issue time and the response time. An intermediate transmission delay between any two adjacent intermediate nodes or between an intermediate node and an adjacent destination node is determined by calculating a difference between the transmission delay between the source node and one of the adjacent nodes and the transmission delay between the source node and the other of the adjacent nodes. The source node is required to specify the route between it and the destination node. The system described does not make provision for a changing topology.

EP-A-0510822 describes a system for monitoring node and link status in a distributed network, in which the network monitoring function is distributed among each of the nodes of the network. A first node designated as a dispatching node, dispatches a status table to another node which is on-line. Selected status information about the receiving node is written into the circulating status table (CST) and selected information about the other nodes is read, and the CST is then forwarded to another on-line node. The CST thus circulates around the network according to an adaptive routing sequence, forming a master record of status information which both accumulates and disseminates information about the various on-line nodes of the network. When it has circulated to each on-line node, the CST returns to the dispatching node.

SUMMARY OF INVENTION

The present invention provides a method and a system for monitoring the performance and status of links and/or nodes of a communications network from a single point of control (POC) node, by propagating a test message between the nodes of the network. The method comprises the following steps:

a first process injects into the network a test message requiring specific information by sending the test message to a node test program entity (NTP) on one of the network nodes, the test message including a designation of the POC node for the test;

automatically in response to receipt of the test message, the receiving NTP sends to the POC a reply message including information from the receiving node, and forwards a test message to an NTP on each of said receiving node's own adjacent connected nodes;

each subsequent receiving NTP, automatically in response to receipt of the forwarded test message, also sends to the POC a reply message including information from said subsequent receiving NTP's node, and forwards a test message to an NTP on each of its own adjacent connected nodes. When the point of control node has received the replies, it can perform an analysis of the received information, compute the performance of any live link (or all live links) or determine the current topology of the network, and possibly display the results and take control actions to modify the network.

In a second aspect, the present invention provides a system for monitoring the performance and status of links and/or nodes of a communications network from a first Point Of Control (POC) node, by propagating a test message between the nodes of the network, the system comprising:

a process for initiating a test by sending to a first Node Test Program entity (NTP) on one of the network nodes a test message requiring specific information, the test message including a designation of the POC node for the test;

a NTP at the POC node and at every other node of the network, each of which nodes can be a current node for test activity, each NTP including means for receiving the test message and means for performing the following two operations, automatically in response to the received test message: sending to the POC a reply message including information from the current node; and forwarding a test message to an NTP on each of the current node's adjacent nodes;

wherein the POC node has means for receiving the reply messages.

The reply messages received by the POC can then be analyzed to determine the performance of links and nodes and their status (perhaps determining whether links are operative or inoperative and analyzing and displaying results of whatever other node status information was included in the reply messages).

A major advantage of the invention is that a node of the network is not required to know the topology of the network, other than to know its nearest neighbor adjacent nodes, in order to take part in the test. Knowledge of how to address adjacent nodes is a general requirement for message communication rather than a requirement which is specific to the monitoring mechanism of the invention. The test message is similarly not required by the invention to include lists of all the links to be tested, or routing advice for the test. This not only reduces the amount of information which must be included in (i.e. the size of) the test messages but also means that test messages need not be modified if the network is reconfigured. In comparison, a system which relies on a centralized database to provide status and performance information has the considerable overhead of maintaining that database e.g. updating to respond to dynamic changes to the network topology.

Thus, the test message which is initially created preferably does not include propagation routing information, except that it includes some designation of the node (or a program thereon) to which it is initially to be sent. This may comprise a queue name or the network address of the node. Each node preferably has address tables of its local nearest neighbors, which tables are available for the onward transmission of test messages and of other messages. It is, however, preferred that each node knows not only how to reach its nearest neighbors but also how to transmit reply messages to the point of control, both of these information items being part of the setup information specified when the node is configured as part of the network. That knowledge of how to reply to the POC is not essential will be explained later.

It is preferred that each one of the injected test messages, each forwarded test message and each reply message is timestamped when sent by the sender, and that each received message is timestamped on receipt by the receiver. These timestamps, which designate the beginning and the end times of the traversal of each link, are returned to the point of control as part of the reply message so that an analysis process associated with the point of control node can calculate the time taken to traverse each link—i.e. the performance of that link.

Another major advantage of the invention is that individual links that are far removed from the point of control may be tested by the injection of a single message: all nodes reply to the point of control so the point of control accumulates information of the whole connected network. The initially injected message will preferably be sent by a POC process on the POC node to an NTP on either the POC node or on one of its adjacent neighbors. The technique of the invention enables simultaneous monitoring of multiple connections between two nodes (automatically detecting all alternate paths) where multiple connections exist, and enables multiple tests initiated at different nodes to be running simultaneously. The running of a test does not prevent normal communication proceeding simultaneously but merely produces a message flow which adds to the normal network traffic—the monitoring method using specialized test messages which are transferred between nodes in the same way as the normal data transmission messages.

In a preferred implementation of the present invention in a network using message queuing communication between programs (as described later), specific test message queues are used to separate network monitoring test messages from other network traffic to prevent resource contention. In that embodiment, a test message is not addressed to a NTP directly, but to a message queue which is serviced by the NTP. Generally, the test messages are sent to a network node on which some mechanism is provided for ensuring that test messages are received by the NTP.

According to the present invention, the test activity propagates throughout the network in a self-exploring manner, exploiting the parallelism of the network, potentially until all live nodes (i.e. nodes which are not failed) which have live direct or indirect communication links to the point of control have been visited by messages generated within the test and have forwarded reply messages to the point of control. Thus, a single action of injecting a test message into the network results in network-wide information being accumulated at the point of control, unless parts of the network are inaccessible due to failed links or nodes. This is a distinction over certain prior art systems which monitor only the existing network traffic rather than using specialized test messages, as such prior art systems are unable to test links and nodes which are not addressed by normal data transmission messages during the monitoring period. The reply messages according to a preferred embodiment of the present invention, as well as carrying performance information, can equally carry any other status information requested by the point of control when it instigated the test.

The desirability of testing the whole network from a single POC node may depend on the size of the network—if the network is very large and complex then the additional network traffic generated by a test of the whole network will be undesirable unless information of the whole network is actually needed. Thus, it is preferred to define a specific domain within the network which is to be tested from the POC when limitation of the test is desired. Alternatively, a test may be limited by specifying a maximum number of node hops from the POC beyond which the test is not propagated.

Preferably each node of the network has installed thereon at network configuration (e.g. when that node is added to the network) a computer program for monitoring, which is similar for all nodes. This program includes a NTP component and a POC component. Then any node may act as a point of control for monitoring the network.

BRIEF DESCRIPTION OF DRAWINGS

Embodiments of the present invention will now be described in more detail, by way of example, with reference to the accompanying drawings in which.

DETAILED DESCRIPTION OF THE PREFERRED EMBODIMENT

Figure 1:
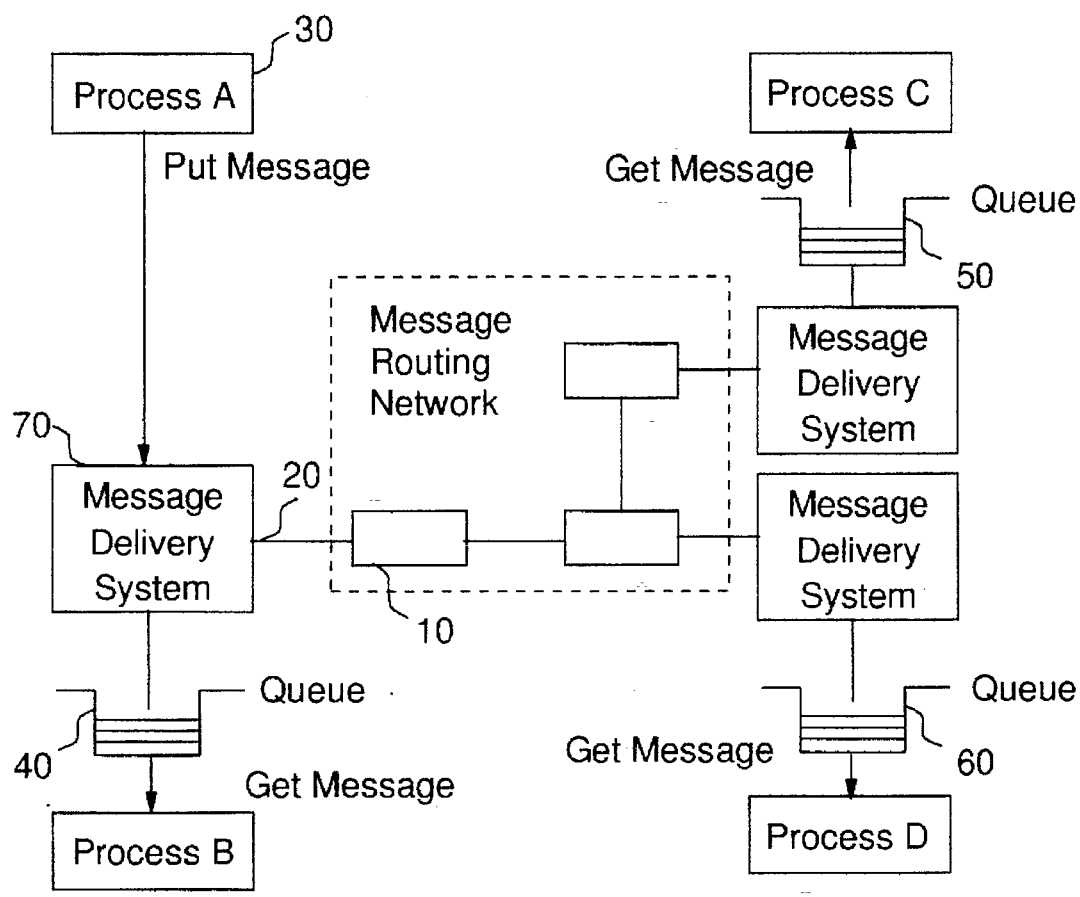
FIG. 1 is a schematic representation of message queuing communication between processes in a simple distributed computer network.

The problem of how to obtain performance and status information about the nodes and interconnecting links of a computer network from a single node of the network occurs in messaging networks—where participating nodes communicate by the asynchronous passing of messages between adjacent nodes in the network. The facility in such systems for inter-process data exchange is often based on management of message queues. The message model is simple: a sending process enqueues messages by putting to a queue (the sending process issues a "Put Message"-type command); and then a receiving process dequeues (issuing a "Get Message"-type command to take the message from the queue either for processing or transferring onwards towards the destination). The enqueue and dequeue operations are performed asynchronously, dequeue being when the receiving process chooses rather than at a time dictated by the sender. Queue managers deliver each message to the proper queue associated with the destination process; it is the network of interconnected queue managers that is responsible for moving messages to the intended queues.

Message queuing is thus a method of inter-program communication which allows programs to send and receive application-specific data without having a direct connection between them, and without necessarily being operational simultaneously. Application programs can run independently of each other, at different speeds and times. The application programs communicate by agreeing to use particular named message queues, sending messages to the specific queues that the target programs have agreed to read from. The locations of the queues are not generally apparent to the applications which send the messages; each application interacts only with its local queue manager. Applications are thereby shielded from network complexities and variations by the queue managers. All of the work involved in maintaining message queues, in maintaining the relationships between messages and queues, in handling network failures and restarts, and in moving messages around the network can be handled by the queue managers. Since cross-network communication sessions are established between queue managers rather than between individual programs, programs are less vulnerable to network failures than in other types of communication.

A message queue is thus a named object in which messages accumulate and from which they are later removed, which is maintained by a particular queue manager. The physical representation of a queue depends on the environment (e.g. it may be a buffer in main storage or a file on disk). A message queue is a storage means whereby messages are normally added and removed in FIFO order, but facilities also exist allowing messages to be read in other than the order in which they arrive on the queue.

Such message queuing communication is further described in IBM Document Number GC33-0805-00 "IBM Messaging and Queuing Series: An Introduction to Messaging and Queuing", and is implemented in the IBM Messaging and Queuing Series products (see the "IBM Messaging and Queuing Series Technical Reference", IBM Document Number SC33-0850-01) such as the IBM Message Queue Manager MVS/ESA.

A schematic representation of message queuing communication is shown in FIG. 1, within a computing network which comprises a set of nodes 10 and interconnecting links 20. There may be a plurality of different physical communication paths between nodes of the network. In this context the "nodes" are the computers of a network, but unless otherwise required by the context the word "node" is intended in the following description to apply equally to program entities running on those computers. The present invention can monitor the status and performance of interconnected computers or of individual communicating processes (e.g. application programs) within the same computer system or between different systems (in the latter case providing an application-connectivity test tool).

A first process A (30) transmits messages to other processes B,C,D by putting messages to message queues (40, 50,60) which the target processes have agreed to receive messages from. The process A simply issues a Put Message command, specifying the name of the destination queue (and possibly the name of a particular queue manager which is responsible for managing that queue). A message delivery system (queue manager) 70 on the computer system on which process A is located is responsible for determining where to route incoming messages and where the messages from A should be sent for example to the incoming queue 40 of another process B on the same computer or across the network to a queue (50 or 60) of a remote process (C or D). In actuality, a message sent to a remote node is transferred in multiple hops between queues on adjacent nodes enroute to the destination node, but this is invisible to the origin and destination processes. Each remote process (C or D) uses a message delivery system (queue manager) which is responsible for putting all incoming messages to the appropriate queue for that process. A queue manager may be responsible for many queues. The processes C and D take the messages from their input queues 50 and 60 when they are ready.

The present invention is particularly applicable to networks using message queuing communication, enabling the monitoring of message queue parameters such as the number of messages on (i.e. the size of) queues, the time taken to service a queue, and other data of the throughflow of messages. Such information is very valuable for systems management, for example for enabling the determination of whether load balancing network reconfiguration is required (e.g. increasing or decreasing the number of application program instances servicing a particular queue).

One aspect of the invention which is particularly relevant to network management in a message queuing system, is the ability of the monitoring method of the present invention to provide performance information for links between nodes in both directions —which may be different from each other since the throughflow of messages across a link depends on the nature and number of application instances servicing (receiving messages from) the queue and the number of applications which are putting messages to the queue, rather than just the limitations of the communications protocol and the capacity of the underlying hardware links.

Figure 2:
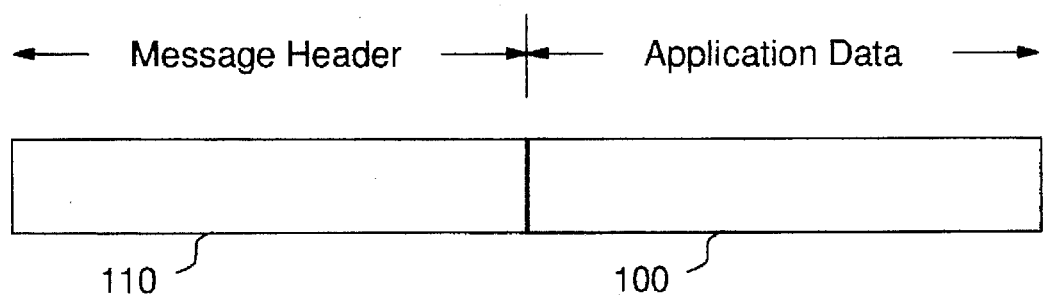
FIG. 2 is a representation of the data fields of an example data transmission message.

As is known in the prior art, a message consists of two components—an application data component 100 and a data structure called the message header 110, containing control information, as shown in FIG. 2. The application data in a message is defined and supplied by the application which sends the message. There are no constraints on the nature of the data in the message (for example, it could consist of one or more bit strings, character strings, or binary integers: if the message is a data transmission message relating to a financial transaction, the application data items within the message may include, for example, a four byte unsigned binary integer containing an account number and a twenty byte character string containing a customer name).

In addition to the application data, a message has associated with it some ancillary data. This is information that specifies the properties of the message, and is used on receipt of the message to decide how the message should be processed. The ancillary control information is contained in the message header 110. Some of this information must be specified by the sending application program. With this message structure, routing information may be included in the message header so that it is possible to determine from the message header whether the message is destined for the local node (e.g. for an application program running on a computer which receives the message) or for an adjacent or remote node of the network, whereby to route the message. In principle, there is not a specific distinction between the information which can be contained in the data portion and that which can be contained in the header portion—information of the origin, destination, time of sending, etc., may be in either portion.

Where the routing information is included in the message's header portion, messages are generally transferred between intermediate nodes enroute to a destination node without the application data being analyzed (or possibly even reformatted) by the intermediate nodes. If different operating systems are running on the various computers of the network, then communication between computers requires, however, reconfiguration of messages according to conventions of a network protocol stack existing between them.

According to the present invention, a test message is a specific type of message which is distinguished from application data messages in that it includes in its message header either: the name or other designation of a queue which is specific to test messages on the target node, so that the receiving queue manager can route the test message appropriately; or a flag by which the receiving node can identify it as a test message without reading the message's data content. The former is the preferred implementation. Three different types of "test messages" may be identified which are associated with the monitoring function of the present invention. These are described below.

Each node of the network has a network management program, which can be identical for each node and which provides the network monitoring facility, installed thereon. The network management program provides the means for propagating a test message throughout the network from a single point of control, in a self-exploring manner, so that the test reaches all of the connected nodes of the network and each node replies to the point of control.

Each node of the network has means for maintaining a list of its adjacent nodes, in a table which contains the names and addresses of the computers (and possibly also the processes thereon or their associated queue names) which have direct connections to the node in question. For a given node the local network manager program has access to the list of adjacent nodes, as a source of information on how to communicate with these adjacent nodes. This list is generated when the system is configured, or more precisely when the particular node is configured as part of the system, and is updated when a new adjacent node is added to the system. Reconfiguration can be done dynamically without taking the relevant nodes out of service. On addition of a new node to the network, that node may broadcast its configuration information to its connected nodes.

A simple naming convention is adopted in that the input queue for node's system management program is: Node_Name.Test_Queue. The test program of the invention then puts messages to "Node_Name.Test_Queue" for each of its neighbor nodes in order to send messages to them. This is sufficient to get to the desired destination neighbors since they are known to the current node.

The network manager program also has the ability to store a global test identifier of the tests for which it receives messages. The network manager program thereby forms a record of test identifiers that can be referred to on receipt of a further test message to determine whether the node has already participated in the particular test of which that new message is a part. The importance of the global test identifier is explained below. Because all nodes have installed the same (or an equivalent) network management program, any node can be the point of control for a particular test instance i.e the node to which test information is returned, and in the preferred embodiment of the invention also the node from which the test is initiated.

Figure 3:
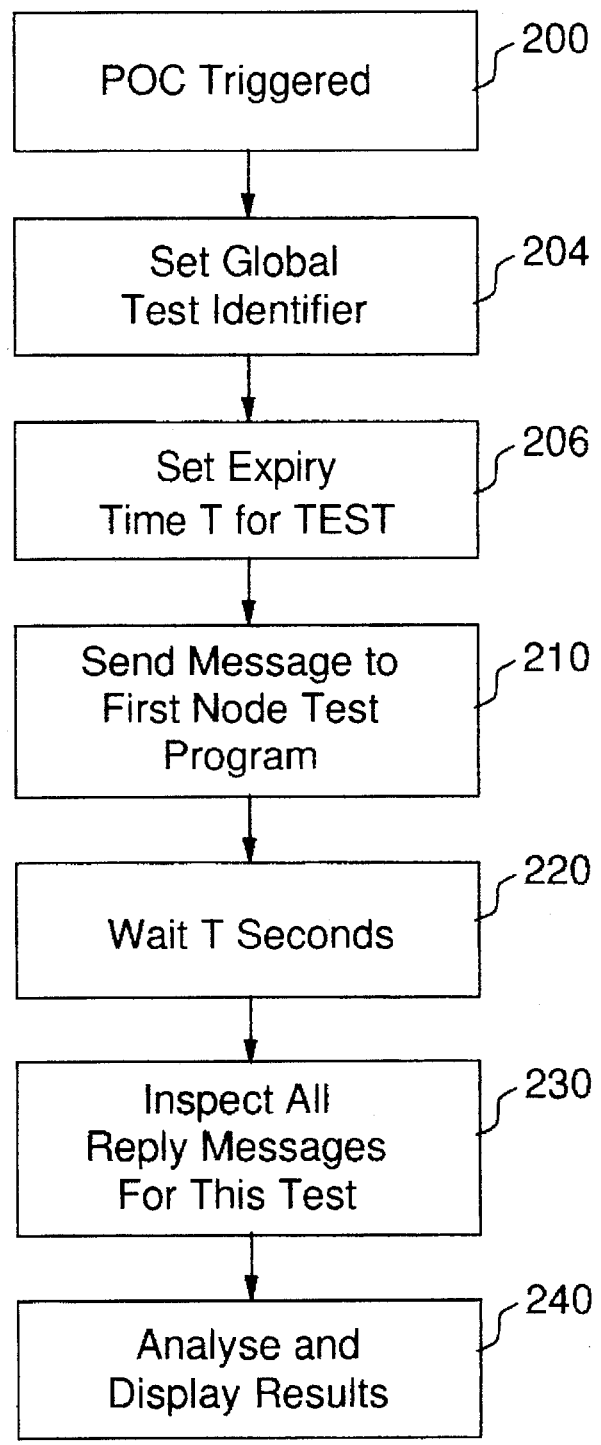
FIG. 3 is a flow diagram showing the steps taken by a Point Of Control process in the execution of a network monitoring method according to an embodiment of the present invention.
Figure 4:
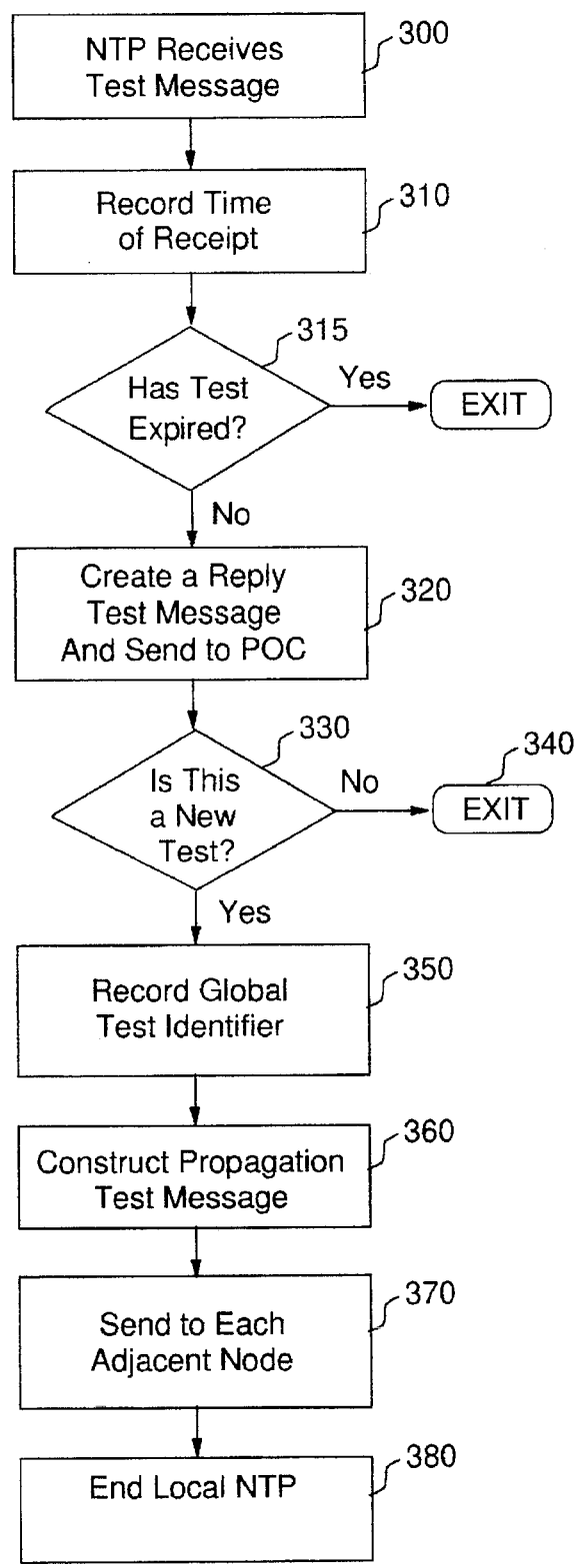
FIG. 4 is a flow diagram showing the steps taken by a Network Test Program on receipt of a network monitoring test message, according to an embodiment of the network monitoring method of the present invention.

The logical steps of the network monitoring function of the network management program for each node are represented in FIGS. 3 and 4. The network management program has two effectively independent components or subroutines which provide the monitoring facility and which can send messages to each other: the first component, referred to as the POC process, provides the means for the node to operate as a point of control (POC) node, initiating a test and receiving responses to the test; and the second, referred to as the network test program (NTP), provides the means at each node to process an incoming test message and then to perform the operations required by the test message. Each node's POC and NTP has its own incoming message queue or there is a single incoming queue for both the POC and NTP. FIG. 3 represents the process steps of the POC and FIG. 4 represents the process steps of the NTP.

In practice, it will generally not be necessary simultaneously to have a plurality of nodes each acting as the single point of control for a different test. However, the facility for multiple POCs is provided by the present invention and may be desirable for enabling different nodes to monitor different network performance parameters. It is much more likely that a network administrator will require only a single POC at any one time to which all test responses are sent, but that the administrator will wish to change which node is the POC on occasion (for example when the current POC is to be disconnected from the network). This is the reason for providing each node with both the POC and NTP components of the network management program.

Monitoring according to the present invention will be of maximum benefit if performed at regular intervals. Thus, a test may be initiated by a timer, for example a new test beginning automatically at the end of the previous test period, but it may equally be initiated in response to a specific request for information from one of the network nodes, or it may be triggered in any other way. When the POC process is triggered 200 to initiate a test, the POC process at the point of control node sends 210 a specific test message to a single first NTP, which is preferably at the POC node but may be at one of its adjacent neighbor nodes. This first message is timestamped as sent i.e. an entry is made in a specific data field. The message also includes a reply address (i.e. the name of the single POC) for the return of reply messages, and a global test identifier 204. The global test identifier is a simple alphanumeric string comprising the node name of the POC, the time of day at which the initial test message was created, and an incremental sequence number. The global test identifier may alternatively be any identifier which is unique for the particular test during the test period and for the network or part of the network which is specified to be tested by the test.

The POC node also specifies 206 an expiry time for the test, which expiry time T is included in the test message sent to the first NTP. This inclusion is advantageous, as will become clear later, because a failed node which receives a test message in its input queue and then becomes operational at some later time can simply delete a message which is clearly part of an expired test. An alternative to this which requires only the POC to know the expiry time of the test is to dispose of messages only at the POC, so that out-of-time messages are returned to the POC. The expiry time is generally not a critical parameter—its selection is determined by the time from the initiation of the test after which the replies to the POC are no longer useful. It is likely that after a certain time any further replies from the network will be considered unacceptably slow, and in such circumstances it will be necessary to take some corrective action but it may be unnecessary to quantify degrees of unacceptability.

The POC's initial message may include further information, depending on what information is required by the particular test instance. The test message itself includes specific data fields for the network administrator to specify what information is required to be included in reply messages. Thus, the administrator can customize or vary what is being monitored. Examples of what information may be required have already been given. In an alternative embodiment of the invention, the test message itself may have no such optional data fields and so does not specify what information is required by the test the NTP programs are instead provided with instructions on set-up of what information is to be included in all reply messages. This alternative is only acceptable if the type of test information required by the POC will always be the same. In implementing this alternative, the node which receives a test message simply needs to identify that a test message has been received and the name of the POC to enable it to construct a standard-structure reply message for sending to the point of control (see later with reference to FIG. 4).

Having sent the first message to the first NTP with instructions on how to reply to the POC, the POC waits 220 for the specified time T. On expiry of time T, the POC inspects 230 all reply messages which are part of the specific test (visible from the global test identifier which is part of all messages within the test) and performs an analysis 240. The POC can then produce tables of performance and status information for display to the network administrator.

The operation of the NTPs will now be described with reference to FIG. 4. On receipt of a test message, each NTP performs the same operations, whether it is the NTP in the POC node receiving the first message sent from the POC or whether it is an NTP on a remote node receiving a test message which has been propagated across many nodes. When a node receives any message from one of its adjacent nodes, a receiving process owned by the queue manager examines the message header to determine where to route the message. If the message is a data message destined for an application program running on the local node then the receiving process directs the message to the incoming message queue for the local application, for retrieval when the application is ready. If the destination application program is a remote application then the receiving process directs the message onwards towards its destination using destination address information in the message header. If the message is a test message, then its header information will specify the receiving node's NTP input queue as its destination and the message will be routed accordingly. In an alternative embodiment which is not a message queuing implementation of the invention, test messages each include a flag which identifies them as a test message. This flag triggers a receiving process on the node to call the local NTP to process the test message.

When a test message arrives on a NTP's incoming message queue, the local NTP will be triggered 300 to retrieve and process it. The NTP first records 310 the time of receipt of the Received Test Message by the current node. It is then determined 315 whether the Received Test Message is part of an expired test, by checking whether the assigned expiry time T has passed. If the test has expired, the local NTP exits (after first deleting from its list of "known" global test identifiers any entry it may have for the relevant global test identifier). If the test has not expired, then the NTP creates 320 a Reply Test Message to return to the POC. As noted earlier, either the received message includes details of what information the Reply Test Message should include or the NTP is given instructions on this during set-up. The queue managers each include means for running processes for measuring performance and status parameters such as message throughput, and the NTP uses an API call to obtain this information. The API can be used to set up limits for triggering specific responses to the POC: for example parameters such as queue depth may have limits set, with a notification being sent to the POC within a Reply Test Message when any received messages extend the queue depth beyond the limit.

The time of receipt of the Received Test Message is included in a data field of the Reply Test Message (i.e. the current node timestamps the test messages before transmitting them). If the test is of link performance only (i.e. no other information is required than times to communicate messages between network nodes), the Reply Test Message may be little more than a notification of receipt bearing the global test identifier and the name of the POC, the node names of the previous and current node and the times of sending and receipt of the Received Test Message. The Reply Test Message thus need only include the information of the Received Test Message plus the timestamp of the time that the message was received at the current node, and the name of the current node. However, the Received Test Message preferably has a plurality of data fields which may be used when the test is initiated to specify information that is required by the test, and then that information will be included in Reply Test Messages. The network management program is designed to perform timestamping automatically on receipt of a test message at the local node, without regard to specific data fields of the test message.

The Reply Test Message will generally include information from the current node about how to reach the POC, which information is provided at the current node during its configuration. Alternatively, each NTP may keep a record of all received messages including information on which of its adjacent nodes sent each message (for example, the name of the node which sent the message may be recorded together with the global test identifier). In that case it is possible to relax the requirement of having to know the POC location—a Reply Test Message can simply be sent to the previous adjacent node (from which the current Received Test Message was sent) which will then send it on towards the POC, retracing the hops of the earlier propagation. Since it is true for all nodes that participate in the test that there is a path to the POC via the previous nodes involved in the propagation, the Reply Test Message can be passed back along that path. (Of course, there is a bi-directionality assumption here that, if a link from A to B is operational, then the link from S to A is also operational within the period of the test. This assumption is not required if the POC location is known to the participating nodes.)

It is then determined 330 for Received Test Messages whether the global test identifier is known to the node. Each node has a list of the global test identifiers of tests in which the current node has already participated, and this list is examined to determine whether the local node has previously received and replied to a test message associated with the current test. If the current node has previously participated in the test in this way, the local Network Test Program instance is exited 340. The global test identifier thus serves to ensure that each node only propagates the test (see below) once for a given test. This is important because, for networks of complex topology, it is probable that a given node will receive a number of Propagated Test Messages within an individual test as all the links to that node are tested; exiting the program after the local test is honored, avoids unnecessary duplication of message flow.

If the test of the Received Test Message is new to the current node, then the global test indicator for the node is recorded 350 in the node's list of global test identifiers. Then a timestamped Propagation Test Message is created 360 at the current node. The Propagated Test Message has the same format as the Received Test Message, except that in relation to the current node the Propagated Test Message includes the name of and time of sending by the current node whereas the Received Test Message includes the name of and time of sending by the previous node. Each Propagated Test Message has the same structure (i.e. number of data fields) as the first—there is no need for the propagated test messages to include accumulated information of all of the network nodes which have participated in the test, and instead information for the current node replaces in the Propagated Test Message the information of the previous node that was included in the Received Test Message.

The Propagated Test Message is then sent 370 to all nodes adjacent the current node and becomes a Received Test Message at each of their NTPs. The test is thereby propagated to the rest of the network. This propagation technique exploits the parallelism of the network as a large number of nodes may be simultaneously working on the same test. A given queue manager in administering message flow is not required to know how to get to a queue or queue manager (except possibly on the POC) that is more than one node "hop" away. The node test program at a given node simply puts messages to the named test message queue ("Node_ Name. Test_Queue") for each of its immediate neighbor nodes. Having sent the reply, stored the global test identifier and propagated messages to its adjacent nodes, the local instance of the Network Test Program is then ended 380.

It is possible for a given node's NTP and POC processes to receive messages from the same incoming queue, although this is not preferred. In that case there must be a mechanism for distinguishing between Reply TestMessages and Propagated Test Messages, and for determining whether the current node is the point of control node for the test. If the message is a Reply Test Message destined for the current node then its information content is stored for analysis. If the test message is not a Reply Test Message then, in response to its receipt, new messages are created by the receiving node for forwarding to adjacent nodes and a Reply Test Message is created for sending to the POC.

As already discussed above in terms of the operations performed by the POC and the various NTPs for a given test, there are three types of test messages involved in the network monitoring method. These three types of test messages are as follows:

1) The Propagated Test Message sent by a node to an adjacent node, which contains:

the global test identifier the name of the single point of control node the name of the node which sent the Propagated Test Message the time when the Propagated Test Message was sent.

The initial message sent from the POC has the structure of a propagated test message, but is rather different in that it is only sent to one node instead of all nodes adjacent to the sending node and in that it is created entirely by its sending (POC) node rather than being generated by processing a Received Test Message.

2) A Received Test Message received at the current node from an adjacent node, which contains:

the global test identifier the name of the single point of control node the name of the previous node that sent the Received Test Message the time when the previous node sent the Received Test Message.

A Propagated Test Message and a Received Test Message are the same entity, and the distinction is in whether their information content relates to the current node or to the previous node.

3) Reply Test Messages, which are sent to the point of control from any node receiving a test message within the current test, which contain:

the global test identifier the name of the single point of control node the name of the previous node that sent the Received Test Message the time when the previous node sent the Received Test Message the time the Received Test Message was received at the current node the name of the current (receiving) node.

The global test identifier, the name of the single point of control for the test, the names of the previous sender node and of the current node, and the time information are preferably included in the message header, but may alternatively be in the data part. In addition, the Reply Test Messages can carry status information from the node in question, which is part of the message's application data component. This status information component is preferably subject to filters and is only included on the first reply from the node, for a given global test. Examples of the status information that the test may require are queue sizes for each node at a point in time, or throughput of messages over time, or the period of time which a message remains on a particular queue or on a particular node.

It should be noted that a reply of sorts is sent to the previous node as well as the Reply Test Message sent to the POC, in the form of one of the Propagated Test Messages. Thus a POC node will receive a Reply Test Message and a Propagated Test Message from each of its adjacent nodes.

Since the individual nodes are not aware of the network topology, it is not very practical to seek to determine when all nodes have processed a Received Test Message for the particular test and when all replies have been received by the POC, nor is it necessary. Instead the propagation and reply phase of the test is considered to be complete when the set time period T expires. The POC then dequeues from its incoming message queue all Reply Test Messages having the global test identifier of the completed test. Of course, the POC may alternatively dequeue Reply Test Messages as they arrive and process the messages at that time to create a table of the received information. The POC process, or another process available for use by the POC, can now move into an analysis phase, where it computes performance or other statistics or determines the topology of the logical network from the point of control. All connected nodes of the network participate in the test and reply to the point of control. By subtraction, the point of control node's analysis process can determine the performance of each node of the network in both directions.

The performance information displayed to the network administrator will generally be actual times to traverse network links or an indication that the time was greater than the time limit T. Thus node or link failures are presented as performance information rather than configuration information, which is more useful for network administration. No distinction is made in the information accumulation stage of the test between node and link failures—each is noted by the time to reply being greater than T. However, analysis of the test output can provide such information in most cases (e.g. if only one of a number of links to a node fails then that this is not a node failure will be clear from the other responses received at the POC).

It should be noted that the method of monitoring according to the present invention has some reliance on the synchronization of the clocks in the participating nodes. However, the computation of times taken to traverse a link in each direction eliminates or reduces this problem, as long as the times that the test messages remain on queues between the NTPs is not significant. This is a reasonable assumption for the preferred embodiment of the present invention which employs specialized queues for the test messages so that the test messages do not await the dequeuing of simultaneously transmitted application data messages. Any distributed network needs some timer services and all nodes will generally have clocks. Provided that the clocks are synchronized to within a period of time which is much shorter than the test expiry time T, the present invention is not compromised. It is reasonable to assume that some method of synchronizing the clocks is provided.

Thus, in the preferred embodiment of the invention, the timestamping of test messages enables direct measurement of link performance between adjacent NTPs, but the performance information for application data messages (taking account of the length of time which they remain on message queues between processes) is obtained indirectly via the API—the NTP accessing the measurements made by the various queue managers and including this information in the Reply Test Messages.

In the alternative that there are not specialized queues for test messages, the timestamped test messages directly obtain information of the performance of application message queues as they utilize those queues. In such an embodiment, the synchronization problem can be solved by periodically running tests for which the test messages are given a higher priority than application messages such that the tests are retrieved from the queues in advance of the application messages (i.e. testing as if the queues were empty of application messages).

Testing according to the present invention may be performed at regular intervals, thereby producing trend information that will have significant value in managing the network. If the required analysis of the information accumulated at the point of control is to compute trends rather than nominal performance values, then there is no reliance on the synchronizing of clocks in the participating nodes despite the time distortions introduced by the synchronizing problem. Alternatively to regular periodic testing, a test may be initiated when a node is notified of some reconfiguration of the network or when a user requests information.

In another alternative implementation of the present invention, each node is only required to send a Reply Test Message to the POC on the first occasion that a message having a particular global test identifier is received. In this way test message traffic is substantially reduced. This embodiment of the invention is satisfactory, for example, where a test is not required to directly measure performance but instead obtains all the information for its Reply Test Messages from the node's queue manager via its API or from some other process.

A consequence of the technique of the present invention using existing network links to test the network should be noted: if link or system failures partition the network into isolated pieces, then only limited information may be received by the single point of control—only nodes that share the same partition as the point of control will respond to the test. However, the failure can be identified to the point of control to enable resolution of the problem.

Partly to reduce the problem mentioned in the last paragraph and additionally because it is rare in the management of large networks for information of the whole network to be required at a single node, a network may be split into specific domains for testing. That is, domains are defined and each node and link is either within or outside the particular test domain. If a node outside the test domain receives a test message, no propagation or reply message will be created. For a large network, this can substantially reduce unwanted network test traffic and in particular reduce the number of expired test messages in the system. An alternative to domain definition, which does require some knowledge of the network topology, is to set a limit for the maximum number of hops from the POC which are to be tested in a given test. A network administrator may also wish to conduct higher level testing on occasion, such as a test of all of the different domains POCs. This is possible if the POCs are enabled to identify themselves when a propagated message of such a high level test is received. A test may alternatively request responses only from specific named nodes.

Having thus described my invention, what I claim and desire to secure by Letters Patent is as follows:

1. A system for monitoring the performance and status of links and/or nodes of a communications network from a first Point of Control (POC) node, by propagating a test message between the nodes of the network, the system comprising:

means for initiating a test by sending to a first Node Test Program (NTP) on one of the network nodes the test message requiring specific information, said test message identifying the POC node for the test;

a NTP at the POC node and at every other node of the network, wherein each node can be a current node for test activity, each NTP including means for receiving the test message and means for performing the operations of sending to the POC node a reply message including information from the current node, and forwarding the test message to the NTP node on each of the current node's adjacent nodes, said operations being done automatically in response to the received test message;

means for receiving said reply messages at the POC node; and means associated with said POC node for analysis of said rely messages.

2. The system according to claim 1 wherein the means for initiating a test includes means for setting an expiration time for the test, which expiration time is included in all forwarded messages and is recognizable by the receiving NTP to indicate that the message should be deleted if the test has expired, without creation of messages by the NTP for forwarding to adjacent nodes or for reply to the POC node.

3. The system according to claim 1, wherein each node of the network is provided with a POC process to perform the operation of the POC node of receiving reply messages to the test.

4. The system according to claim 1 or claim 3, wherein the POC node has program means for initiating tests by sending the test message to the NTP at the POC node or at an adjacent node.

5. The system according to claim 1 or claim 3, wherein the NTP at each node of the network, as the current node for test activity, includes means for timestamping messages on sending and on receipt by the current node, and for including in said reply messages sent to the POC node information of the time the test message was sent by the previous node and of the time the test message was received by the current node.

6. The system according to claim 5, including means associated with the point of control node for analyzing the time information of the reply messages to compute the performance of particular nodes and links of the network.

7. The system according to claim 1 or claim 3, including means associated with the point of control node for analyzing the information of the reply messages to determine the topology of the network from the point of control node.

8. The system according to claim 5, including means for exiting the current node's NTP on receipt of the test message which is part of the test for which the current node has previously received the test message, without forwarding test messages to NTPs on the adjacent nodes.

9. The system according to claim 8, wherein the POC node program means for initiating a test includes means for setting a global test identifier for the test message, which test identifier is unique to the particular test of the current message and is identifiable by NTPs on receipt of the message to identify the particular test, wherein each node of the network has means for maintaining a list of the global test identifiers for tests which are known to the node.

10. A method for monitoring the performance and status of links and/or nodes of a communications network from a single point of control (POC) node, by propagating a test message between the nodes of the network, the method comprising the following steps:

injecting into the network the test message requiring specific information by sending the test message to a node test program (NTP) on one of the network nodes, said test message identifying the POC node for the test;

automatically, in response to receipt of the test message, sending to the POC node from the receiving NTP a reply message including information from the receiving node, and forwarding the test message to the NTP on each of said receiving node's adjacent connected nodes;

each subsequent receiving NTP, automatically in response to receipt of the forwarded test message, at least if the received test message is within an unexpired test, sending to the POC node a reply message including information from said subsequent receiving NTP's node, and, at least the first time said subsequent NTP receives a message within a given test, forwarding the test message to the NTP on each of its own adjacent connected nodes; and analyzing reply messages received by the POC node.

11. The method according to claim 10 including the step of setting an expiration time for the test when the test is initiated, which expiration time is then included in all forwarded messages and is recognizable by the receiving NTP to indicate that the message should be deleted if the test has expired, without creation of messages by the NTP for forwarding to adjacent nodes or for reply to the POC node.

12. The method according to claim 10, wherein the test message is injected into the network by a first POC process on the POC node which sends the test message to the NTP on the POC node or on one of the POC node's adjacent nodes.

13. The method according to claim 10 or claim 12, wherein the test message is timestamped on sending and on receipt by a current node, and information of the times that the test message was sent by a previous node and received by the current node are included in reply messages sent to the POC node.

14. The method according to claim 13, wherein the time information of the reply messages is analyzed by a process associated with the POC node to compute the performance of particular nodes and links of the network.

15. The method according to claim 10 or claim 12, wherein the information of the reply messages is analyzed by a process associated with the point of control node to determine the topology of the network from the point of control node.

16. The method according to claim 10 or claim 12 wherein the NTP only propagates the test message to the receiving node's adjacent nodes on the first occasion that the node receives a propagated test message within the particular test.

17. The method according to claim 16, wherein the POC process sets a global test identifier for the test message when it initiates the test, which test identifier is unique to the particular test of the current test message and is identifiable by NTPs on receipt of the test message to identify the particular test, each node of the network maintaining a list of the global test identifiers of tests for which messages have been received by the current node.

18. A computer having means for monitoring the performance and status of links and/or nodes of a communications network which includes the computer, the computer having a network management program thereon which comprises:

a Point of Control (POC) means for initiating a test by sending to a first Node Test Program (NTP) on said computer or on a connected computer a test message requiring specific information, said test message identifying the computer as the POC node for the test, the POC process including means for receiving, from NTPs on the computer and on other computers with direct or indirect connections thereto, reply messages to a test for which the computer is the identified POC node; and a Network Test Program (NTP) for processing a received test message automatically on receipt by performing the following operations: sending to the POC node identified by the received test message a reply including information from the current computer; and forwarding the test message to the NTP on each of the adjacent computers with direct connections to the current computer;

said network management program further comprising means associated with the POC means for analyzing said reply messages.

* * * * *